No. 669,124. Patented Mar. 5, 1901.
A. RIEBE.
BALL BEARING.
(Application filed Oct. 22, 1900.)

(No Model.)

Witnesses:

Inventor
August Riebe
by Herbert W. Jenner
Attorney

THE NORRIS PETERS CO., PHOTO-LITHO., WASHINGTON, D. C.

UNITED STATES PATENT OFFICE.

AUGUST RIEBE, OF BERLIN, GERMANY.

BALL-BEARING.

SPECIFICATION forming part of Letters Patent No. 669,124, dated March 5, 1901.

Application filed October 22, 1900. Serial No. 33,895. (No model.)

*To all whom it may concern:*

Be it known that I, AUGUST RIEBE, mechanical engineer, a subject of the King of Prussia, German Emperor, residing at 15$^d$ Zwinglistrasse, Berlin, Kingdom of Prussia, German Empire, have invented certain new and useful Improvements in Ball-Bearings; and I do hereby declare the following to be a full, clear, and exact description of the invention, such as will enable others skilled in the art to which it appertains to make and use the same.

Heretofore it has been proposed to make ball-bearings with a ball-race consisting of a ring, which while presenting a groove or race proper for the balls to travel in is at one point of its periphery provided with a lateral opening or notch extending to the level of the groove or race, through which the balls may be inserted, removed, or exchanged, the notch being closed by a removable gap filling or closing piece or block; and the essential feature of this invention is that in the case of ball-races of somewhat small diameter a screw is provided in lieu of such gap-filling piece, which serves to close up the ball-race and to keep the balls from slipping out through the lateral aperture.

The invention is illustrated in the accompanying drawings, in which—

Figure 1:
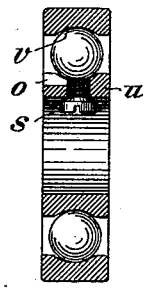
Figure 2:
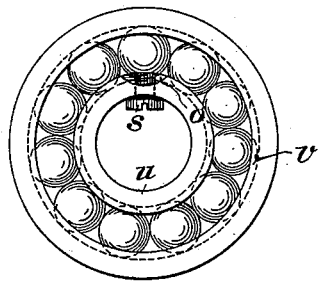

Figure 1 is a section, and Fig. 2 a side elevation, of a ball-race constructed in accordance with this invention.

In the arrangement shown in the drawings, wherein for the sake of simplicity the shaft is omitted, the inner of the two annular grooved rings *v u*, jointly forming the ball-race, is provided with the side aperture *o* for the insertion of the balls. Now at the requisite point in the central plane of the two rings the screw *s* is inserted radially from within, so that its end extending into the ball-inserting aperture completes the ball-race and retains the balls so that they cannot leave the race through such aperture until the screw is removed. At the same time the inwardly-projecting head of the screw may serve to secure the part *u* of the ball-race from any tendency to revolve around the shaft. As before stated, this construction of ball-race is mainly intended for ball-races of small diameter, where a simple gap-filling piece would have to be made very small, so that it would not afford the fastening-screw a sufficient hold.

What I claim is—

1. In a ball-bearing, the combination, with an inner ball-race and an outer ball-race, one of the said races being provided with a lateral opening for the insertion and removal of the balls; of a series of balls arranged between the ball-races, and a screw inserted through the ball-race provided with the said lateral opening radial to the axis of the said races, and preventing the balls from passing through the said opening, substantially as set forth.

2. In a ball-bearing, the combination, with an inner ball-race and an outer ball-race, said inner race being provided with a shaft-bearing and a lateral opening for the insertion and removal of the balls; of a series of balls arranged between the ball-races, and a screw inserted through the inner ball-race radially of its axis and provided with a head which projects into the said shaft-bearing, said screw operating to prevent the balls from passing through the said opening, substantially as set forth.

In testimony whereof I affix my signature in presence of two witnesses.

AUGUST RIEBE.

Witnesses:
 WOLDEMAR HAUPT,
 HENRY HASPER.